(12) United States Patent
Bayoumi

(10) Patent No.: US 11,118,724 B1
(45) Date of Patent: Sep. 14, 2021

(54) SOLAR MODULE WITH TILT FREEDOM

(71) Applicant: King Abdulaziz University, Jeddah (SA)

(72) Inventor: Mohannad Bayoumi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/206,575

(22) Filed: Mar. 19, 2021

Related U.S. Application Data

(63) Continuation of application No. 17/095,398, filed on Nov. 11, 2020.

(51) Int. Cl.
| | |
|---|---|
| *F16M 11/00* | (2006.01) |
| *F16M 11/20* | (2006.01) |
| *G02B 7/182* | (2021.01) |
| *H02S 20/32* | (2014.01) |
| *E04F 10/00* | (2006.01) |

(52) U.S. Cl.
CPC ......... *F16M 11/2021* (2013.01); *G02B 7/182* (2013.01); *H02S 20/32* (2014.12); *E04F 10/00* (2013.01)

(58) Field of Classification Search
None
See application file for complete search history.

(56) References Cited

U.S. PATENT DOCUMENTS

| | | | | |
|---|---|---|---|---|
| 4,371,139 A * | 2/1983 | Clark | ...................... | F24S 25/61 248/237 |
| 8,661,747 B2 * | 3/2014 | Eide | ...................... | E04D 13/031 52/173.3 |
| 8,683,761 B2 * | 4/2014 | Danning | ............... | F24S 25/636 52/173.3 |
| 9,146,044 B2 | 9/2015 | Surganov | | |
| 9,496,822 B2 | 11/2016 | Gerwing | | |
| 10,367,446 B2 * | 7/2019 | Tanaka | ..................... | H02S 20/30 |
| 10,476,425 B2 * | 11/2019 | Stearns | ................... | H02S 20/23 |
| 10,495,349 B1 * | 12/2019 | Winkle | ................... | F24S 25/65 |

FOREIGN PATENT DOCUMENTS

| | | |
|---|---|---|
| CN | 20 2011 004 603 U1 | 11/2011 |
| CN | 110601651 A | 12/2019 |
| CN | 110798135 A | 2/2020 |
| CN | 210297618 U | 4/2020 |

* cited by examiner

*Primary Examiner* — Steven M Marsh

(74) *Attorney, Agent, or Firm* — Oblon, McClelland, Maier & Neustadt, L.L.P.

(57) ABSTRACT

An adjustable support for a panel is provided to allow control of the height and the tilt angle of the panel. The support includes a hollow cylindrical base having an outer diameter $D_1$; a first hollow piston having an outer diameter $D_2$ threadably engaged with the base; a second hollow piston having an outer diameter $D_3$ threadably engaged with the first piston; a third piston having an outer diameter $D_4$ threadably engaged with the second piston, such that $D_1 > D_2 > D_3 > D_4$. A ball pod extends from the third piston and accommodates a ball attached to the panel. One or more stepper motors are provided, where each stepper motor is coupled to a bottom portion of a respective piston, and a rotor of each stepper motor is configured to rotate the corresponding piston, thereby causing the piston to move along a longitudinal axis of the support.

8 Claims, 12 Drawing Sheets

SOLAR MODULE WITH TILT FREEDOM

CROSS-REFERENCE TO RELATED APPLICATIONS

The present application is a continuation of Ser. No. 17/095,398, pending, having a filing date of Nov. 11, 2020.

BACKGROUND

Technical Field

The present disclosure is directed, generally, to an adjustable support for a panel and, more particularly, to a linearly adjustable support for a solar panel.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Solar energy is typically captured using photovoltaic (PV) modules. Mounting systems for the PV modules are either fixed or can track the diurnal motion of the sun and accordingly absorb solar energy. Systems currently known to adjust a PV module based on solar tracking include single axis tracking devices or dual axis tracking devices which are often associated with multiple mechanical components, thereby making the systems complex in nature. However, such systems are not feasible to be adapted for small scale harvesting of solar energy, such as for residential buildings.

Additionally, tracking mirrors, solar shades, television panels and other applications involving panels or plates may be supported by adjustable legs or stands. These devices may receive user input or respond to sensor inputs to raise, lower or tilt the panels or plates. There is a need for an adjustable support for smaller panels which provides a fine degree of adjustment.

Accordingly, it is one object of the present disclosure to provide devices and methods for supporting and adjusting a panel which can be used for small installations.

SUMMARY

In an exemplary embodiment, an adjustable support for a panel is described. The adjustable support includes a first and a second leg. Each leg of the adjustable support includes a hollow cylindrical base having an outer diameter $D_1$, an inner diameter $D_2$ and a first closed end, a first stage including a first hollow cylindrical piston having outer diameter $D_2$, inner diameter $D_3$ and a second closed end, and a first rotor of a first stepper motor located within a void space of the second closed end. Each leg of the adjustable support further includes a second stage including a second hollow cylindrical piston having an outer diameter $D_3$, an inner diameter $D_4$ and a third closed end, a second rotor of a second stepper motor located within a void space of the third closed end. Each leg of the adjustable support further includes a third stage including a third cylindrical piston having an outer diameter $D_4$ and a fourth closed end, and a third rotor of a third stepper motor located within a void space of the fourth closed end. Each leg of the adjustable support also includes a ball pod socket connected to the third cylindrical piston and a ball connected to a mounting plate, wherein the ball is configured to rotate within the pod socket, and wherein $D_1 > D_2 > D_3 > D_4$.

In another exemplary embodiment, a method of adjustably supporting a panel is described. The method includes mounting the panel to a first mounting plate near a first corner of the panel, wherein the first mounting plate is connected to a first ball; and mounting the panel to a second mounting plate near a diametrically opposed second corner of the panel, wherein the second mounting plate is connected to a second ball. The method further includes connecting the first ball to a first ball pod socket, connecting the second ball to a second ball pod socket, connecting the first ball pod socket to a first piston of a first series of cylindrical threaded pistons, and connecting the second ball pod socket to a piston of a second series of cylindrical threaded pistons. The method further includes installing a rotor of a stepper motor within a void space beneath each cylindrical threaded piston, wherein each rotor is operatively connected to a stator which is outside of the void space, installing a first cylindrical base beneath the first series of cylindrical threaded pistons, and installing a second cylindrical base beneath the second series of cylindrical threaded pistons. The method also includes connecting each stepper motor to a computing device including a computer-readable medium comprising program instructions, executable by processing circuitry, to cause the processing circuitry to generate drive signals, and adjusting the orientation of the panel by providing the drive signals to each stepper motor to raise or lower the first or the second series of cylindrical threaded pistons.

In another exemplary embodiment, another method of adjusting a panel is described. The method includes determining, by a computing system, a desired orientation of the panel, mounting the panel to ball pad mounting plates on each of two adjustable legs, and providing, by the computing system, drive signals to stepper motors located within a series of three nested, threaded pistons on each of the two adjustable legs. For each adjustable leg, the method includes rotating a first piston so that outer threads of the first piston engage with a corresponding inner threads of a second piston to raise or lower the first piston; rotating a second piston so that outer threads of the second piston engage with a corresponding inner threads of a third piston to raise or lower the second piston; and rotating a third piston so that outer threads of the third piston engage with a corresponding inner threads of a cylindrical base to raise or lower the third piston.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
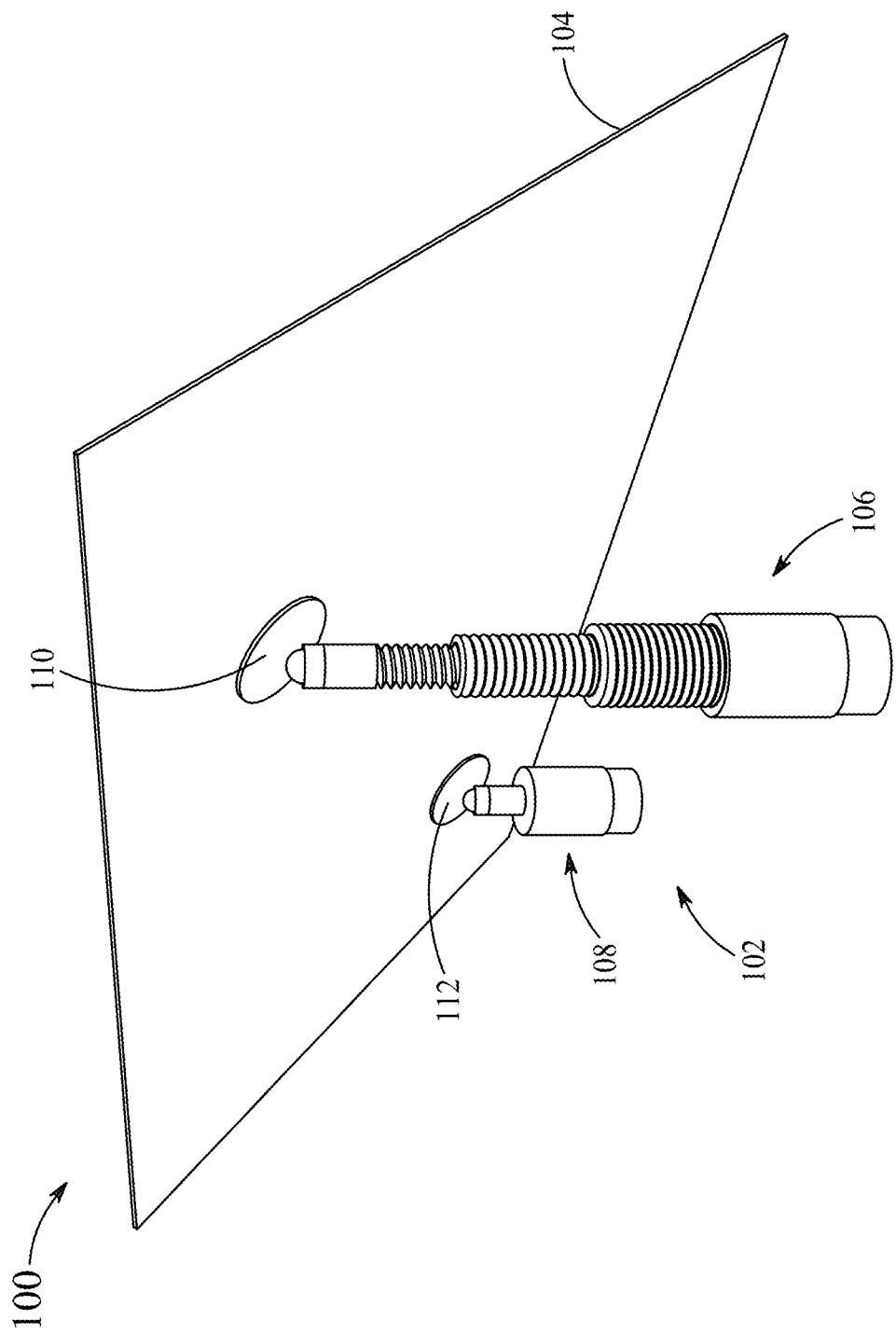
FIG. 1 is a perspective view of an adjustable support coupled to a panel, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to an adjustable support for a panel and a method for adjustably supporting the panel. The adjustable support is configured to adjust height and inclination of the panel based on predefined parameters.

In an embodiment, the present disclosure relates to a solar panel assembly comprising a rectangular PV solar panel having two mounting plates connected to a rear surface of the panel, each mounting plate having a ball joint, such that the mounting plates are located at diagonally opposite corners of the panel. Two extendable supports, each mount having three extendable nested sections, wherein each extendable nested section has a stepper motor mounted at base thereof, are each connected to the PV panel via a corresponding ball joint, and each extendable mount is configured to raise and lower respective extendable sections, thereby raising or lowering a portion of the PV panel. Although a PV panel is used to describe the use of the adjustable support, the panel may be any kind of panel, such as a mirror, a flat panel television screen or monitor, a satellite dish, a radar antenna, a sun shade or the like.

Referring to FIG. 1, a perspective view of a panel assembly 100 is illustrated, according to aspects of the present disclosure. The panel assembly 100 includes an adjustable support 102 (hereinafter referred to as "the support 102") and a panel 104 attached to the support 102. In an aspect, the panel 104 is implemented as a solar panel. In a non-limiting example, the solar panel may have a length of about 1650 mm and a breadth of about 1000 mm. In some embodiments, the panel 104 may be implemented as a mirror, a flat panel, a satellite dish, a radar antenna, a sun shade or the like. The support 102 includes a first leg 106 and a second leg 108. The panel 104 is embodied as a rectangular structure and is coupled to both the first leg 106 and the second leg 108. Particularly, the panel 104 is attached to a first mounting plate 110 of the first leg 106 at a first position on the back surface thereof and to a second mounting plate 112 of the second leg 108 at a second position on the back surface thereof. The attachment of the panel 104 to the first mounting plate 110 and the second mounting plate 112 may be by suction, mounting screws, adhesive, clamps, or the like.

As shown in FIG. 1, the first position of attachment and the second position of attachment are along a diagonal axis of the panel 104. However, in some embodiments, the first position of attachment and the second position of attachment may be along a length the panel 104, a breadth of the panel 104, or in any feasible manner. In cases where the panel 104 is implemented as a circular structure, the first position of attachment and the second position of attachment may be along a diameter of the panel 104 or a chord of the panel 104.

In an aspect, the support 102 is configured to adjust an inclination (alternatively referred to as "tilt angle") of the panel 104 based on solar parameters (alternatively referred to as solar tracking). For example, the solar parameters may include, but are not limited to, geographical location at which the panel assembly 100 is deployed, sunrise time, sunset time, and weather conditions. In an embodiment, the support 102 may be configured to adjust the panel 104 at an inclination of up to 45 degrees with respect to a horizontal axis and at an inclination of up to 20 degrees with respect to a vertical axis.

Figure 2A:
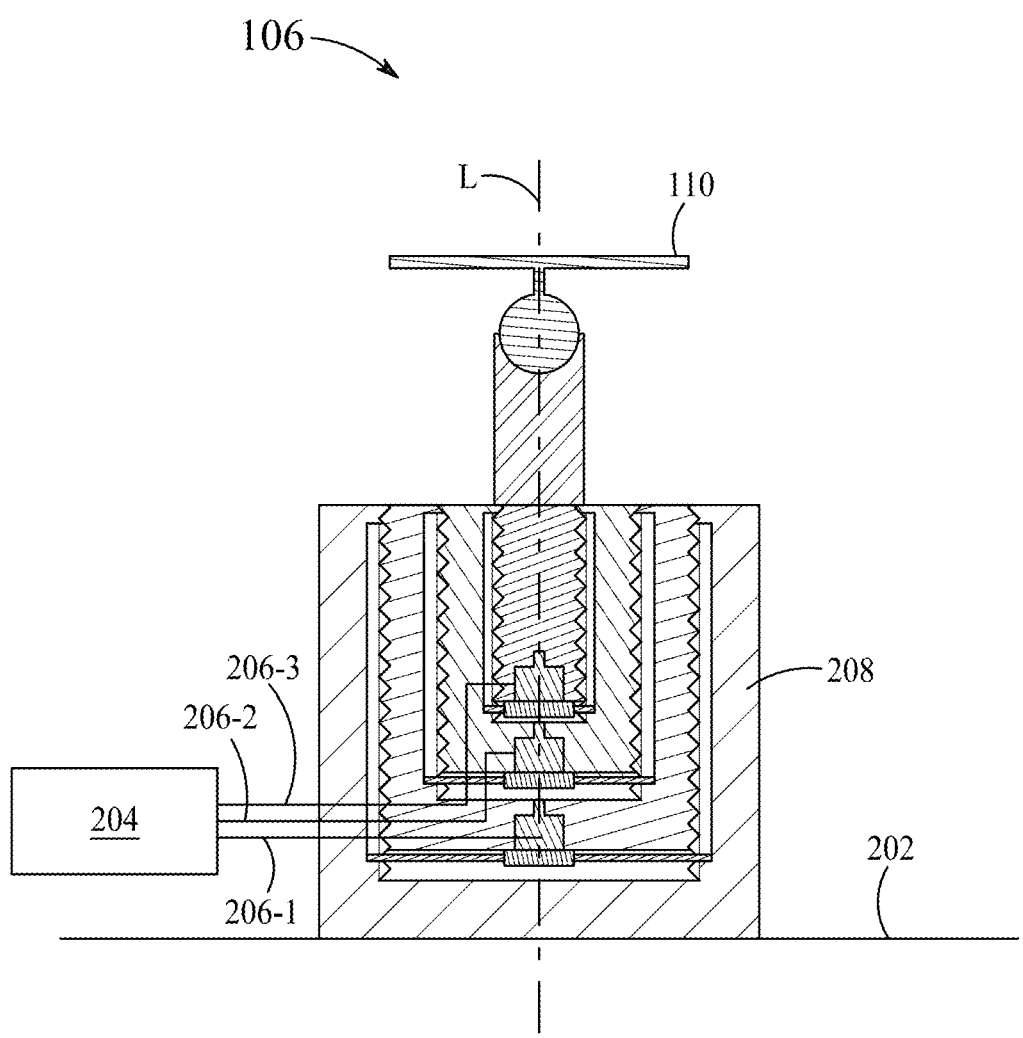
FIG. 2A is a cross-sectional view of a first leg of the adjustable support in a retracted condition, according to exemplary aspects of the present disclosure.

FIG. 2A shows a cross-sectional view of the first leg 106 of the support 102 in a retracted condition. As used herein, the term "retracted condition" refers to a collapsed state of the first leg 106 where the first mounting plate 110 is proximal to a horizontal surface 202 on which the first leg 106 is mounted. In a non-limiting example, in the retracted condition, a distance between the first mounting plate 110 and the horizontal surface 202 may be about 280 mm. However, the distance between the first mounting plate 110 and the horizontal surface 202 is not limited to 280 mm and may be chosen with respect to many factors, such as panel size, location and design specifications.

Figure 2B:
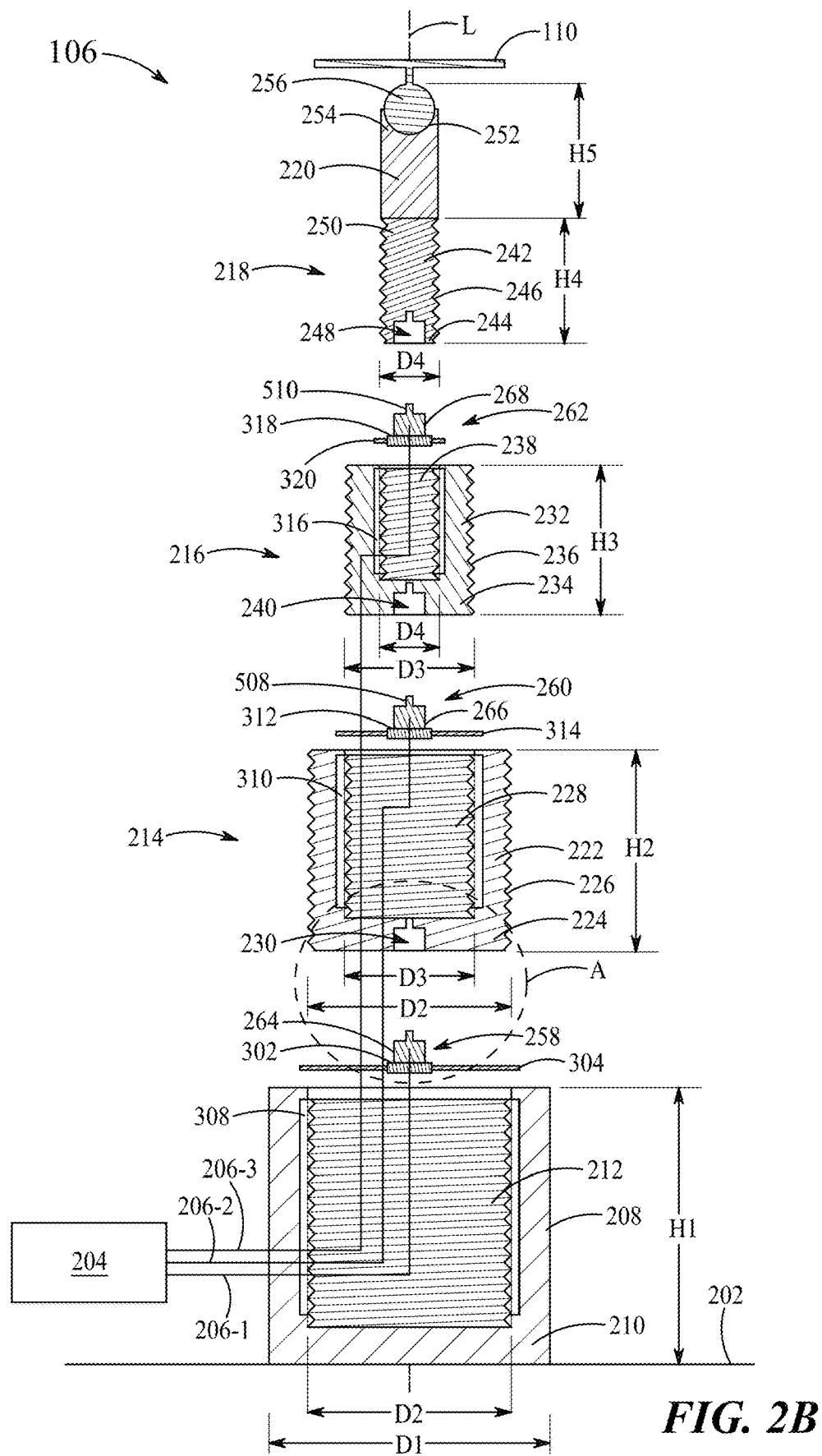
FIG. 2B is a cross-sectional exploded view of the first leg of the adjustable support, according to exemplary aspects of the present disclosure.

FIG. 2B shows a cross-sectional exploded view of the first leg 106 of the support 102. The exploded view corresponds to an expanded condition of the first leg 106. As used herein, the term "expanded condition" refers to a deployed state of the first leg 106 where the first mounting plate 110 is distal to the horizontal surface 202. In a non-limiting example, in the expanded condition, a distance between the first mounting plate 110 and the horizontal surface 202 may be about twice that of the retracted view of FIG. 2A. In a non-limiting example, the distance may be about 640 mm.

According to an aspect of the present disclosure, a control module 204 (also shown in FIG. 2A) is electrically connected to the first leg 106 through one or more wires 206 to actuate the first leg 106 from the retracted condition to the expanded condition based on the solar parameters (alternatively referred to as solar tracking). According to an aspect of the present disclosure, the first leg 106 includes a hollow cylindrical base 208 (hereinafter referred to as "the base 208") having an outer diameter $D_1$, an inner diameter $D_2$, a height $H_1$, a first closed end 210, and an inner threaded cylindrical surface 212. In a non-limiting example, the base 208 may have a length of about 180 mm and outer diameter $D_1$ of about 180 mm. The first leg 106 further includes a first stage 214, a second stage 216, a third stage 218, a ball pod socket 220 concentrically aligned along a central longitudinal axis "L" of the first leg 106.

The first stage 214 includes a first hollow cylindrical piston 222 (hereinafter referred to as "the first piston 222") having an outer diameter $D_2$, an inner diameter $D_3$, a height $H_2$, a second closed end 224, an outer threaded cylindrical surface 226, and an inner threaded cylindrical surface 228. In a non-limiting example, the first piston 222 may have a length of about 150 mm and the outer diameter $D_2$ of about 135 mm. The first piston 222 is disposed within the base 208 (see FIG. 2A). The threads of the inner threaded cylindrical surface 212 of the base 208 are configured to intermesh with the threads of the outer threaded cylindrical surface 226 of the first piston 222. Accordingly, rotation of the first piston 222 in clockwise or anticlockwise directions allows an inward movement or an outward movement respectively of the first piston 222 along the central longitudinal axis "L" with respect to the base 208. Although the inner diameter $D_2$ of the base 208 and the outer diameter $D_2$ of the first piston 222 has been referenced with "$D_2$", the two diameters may have sufficient tolerances to allow the base 208 to receive the first piston 222. According to an aspect of the present disclosure, the second closed end 224 of the first piston 222 defines a void space 230 (also shown in FIG. 5).

The second stage 216 includes a second hollow cylindrical piston 232 (hereinafter referred to as "the second piston 232") having an outer diameter $D_3$, an inner diameter $D_4$, a height $H_3$, a third closed end 234, an outer threaded cylindrical surface 236, and an inner threaded cylindrical surface 238. In a non-limiting example, the second piston 232 may have a length of about 120 mm and the outer diameter $D_3$ of about 90 mm. The second piston 232 is disposed within the first piston 222 (see FIG. 2A). The threads of the inner threaded cylindrical surface 228 of the first piston 222 are configured to intermesh with the threads of the outer threaded cylindrical surface 236 of the second piston 232. Accordingly, rotation of the second piston 232 in clockwise and anticlockwise direction respectively allows an inward movement and an outward movement of the second piston 232 along the central longitudinal axis "L" with respect to the first piston 222. According to an aspect of the present disclosure, the third closed end 234 of the second piston 232 defines a void space 240.

The third stage 218 includes a third cylindrical piston 242 (hereinafter referred to as "the third piston 242") having an outer diameter $D_4$, a height $H_4$, a fourth closed end 244, a fifth closed end 250, and an outer threaded cylindrical surface 246. In a non-limiting example, the third piston 242 may have a length of about 90 mm and the outer diameter $D_4$ of about 45 mm. The third piston 242 is disposed within the second piston 232 (see FIG. 2A). The threads of the inner threaded cylindrical surface 238 of the second piston 232 are configured to intermesh with the threads of the outer threaded cylindrical surface 246 of the third piston 242. Accordingly, rotation of the third piston 242 in clockwise and anticlockwise direction respectively allows an inward movement and an outward movement of the third piston 242 along the central longitudinal axis "L" with respect to the second piston 232. According to an aspect of the present disclosure, the fourth closed end 244 of the third piston 242 defines a void space 248. The ball pod socket 220 extends along the central longitudinal axis "L" from the fifth closed end 250 of the third piston 242 and defines a depression 252 at a free end 254 thereof. In a non-limiting example, the ball pod socket piston 220 may have a length of about 72 mm. The first leg 106 further includes a ball 256 connected to the first mounting plate 110, such that the ball 256 is supported by and configured to rotate within the depression 252 of the ball pod socket 220. As used herein, the term "rotatably supported" includes a structure and dimensions of the depression 252 which can receive and secure the ball 256 therein while also allowing rotation of the ball 256. The free end 254 of the ball pod socket 220 may be designed to secure the ball 256 therein and prevent the ball 256 from disengaging from the ball pod socket 220 while the panel 104 tilts. According to an aspect of the present disclosure, $D_1 > D_2 > D_3 > D_4$; $H_1 > H_2 > H_3 > H_4$; and $H_4 = H_5$, where $H_5$ is a height of the ball pod socket 220 and the ball 256 together. According to another aspect of the present disclosure, $D_2 = 0.75 D_1$; $D_3 = 0.5 D_1$; $D_4 = 0.25 D_1$; $H_2 = 5/6\, H_1$; $H_3 = 2/3\, H_1$; and $H_4 = H_5 = 0.5\, H_1$.

For the purpose of rotating each of the stages 214, 216, 218 individually, according to an aspect of the present disclosure, the first leg 106 further includes stepper motors. Particularly, a first stepper motor 258 is adapted to fit within the void space 230 of the first piston 222 and configured to rotate the first piston 222 with respect to the base 208, thereby raising or lowering the first piston 222 along the central longitudinal axis "L". Similarly, a second stepper motor 260 is adapted to fit within the void space 240 of the second piston 232 and configured to rotate the second piston 232 with respect to the first piston 222, thereby raising or lowering the second piston 232 along the central longitudinal axis "L". Further, a third stepper motor 262 is adapted to fit within the void space 248 of the third piston 242 and configured to rotate the third piston 242 with respect to the second piston 232, thereby raising or lowering the third piston 242 along central the longitudinal axis "L".

As described earlier, the control module 204 is electrically connected to the first leg 106 and configured to actuate the first leg 106 from the retracted condition to the expanded condition. In some embodiments, the control module 204 includes a computer-readable medium comprising program instructions, executable by a processing circuitry, to cause the processing circuitry to perform solar tracking and accordingly provide drive signals to each stepper motor to adjust the tilt of the panel 104 based on the solar tracking or operator input.

According to an aspect of the present disclosure, the control module 204 is individually coupled to each stepper motor. Specifically, a first wire 206-1 extends between the control module 204 and the first stepper motor 258, a second wire 206-2 extends between the control module 204 an the second stepper motor 260 and a third wire 206-3 extends between the control module 204 and the third stepper motor 262.

Each of the first wire 206-1, the second wire 206-2 and the third wire 206-3 (collectively referred to as "the wire(s) 206") may be routed through the inner cavities of the base 208, the first piston 222 and the second piston 232 towards the respective stepper motor. For example, wall of each of the base 208, the first piston 222 and the second piston 232 may define a through-hole to allow the respective wire 206 to be routed radially inward therethrough and the wire 206 may then be routed towards the corresponding stepper motor through hollow space defined in the corresponding piston. Length of each of the wires 206 may be sufficient to allow travel of each piston of the first leg 106 to a maximum predefined height along the central longitudinal axis "L" of the first leg 106.

Although not specifically illustrated and described, it should be understood that the second leg 108 is similar in construction as that of the first leg 106. As such, the control module 204 may be coupled to each stepper motor of the second leg 108 and configured to actuate the stepper motors to allow retraction and expansion of corresponding pistons in the second leg 108. According to an aspect of the present disclosure, the control module 204 is configured to simultaneously or selectively actuate the stepper motors of the first leg 106 and the second leg 108 to achieve a desired tilt angle of the panel 104. For example, by controlling supply of electric current to the stepper motors, the control module 204 may achieve the desired tilt angle of the panel 104.

According to an aspect of the present disclosure, the panel 104 may be embodied as a mirror attached to the first mounting plate 100 and the second mounting plate 112. Accordingly, the control module 204 may be configured to actuate the stepper motors to raise and lower respective stages of the first leg 106 and the second 108 to adjust the tilt of the mirror.

According to another aspect of the present disclosure, the panel 104 may be embodied as a sun shading device. Accordingly, the control module 204 may be configured to actuate the stepper motors to raise and lower respective stages of the first leg 106 and the second 108 to adjust the tilt of the sun shading device based on solar tracking or on user inputs.

Figure 3:
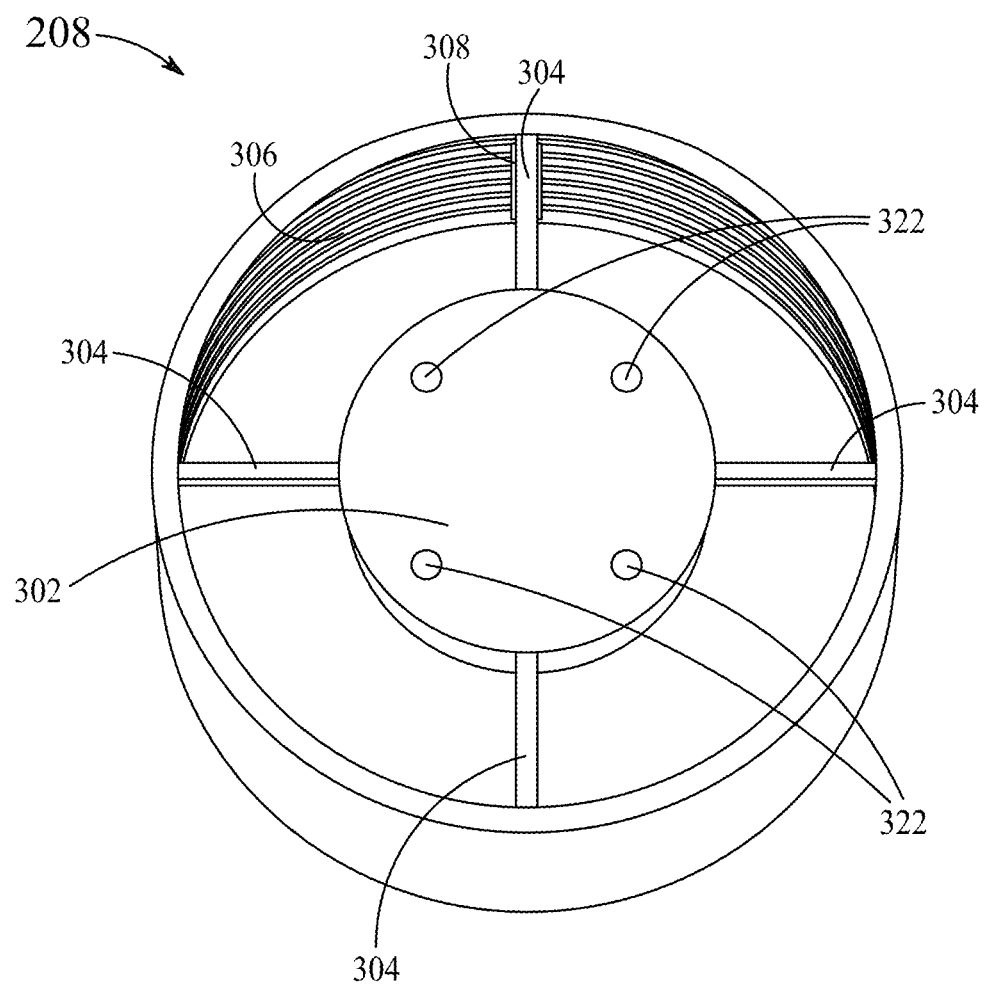
FIG. 3 is a perspective view of a base of the adjustable support, according to exemplary aspects of the present disclosure.

FIG. 3 shows a perspective view of the base 208 of the first leg 106. FIG. 3 is described in conjunction with FIG. 2B. According to an aspect of the present disclosure, the first leg 106 includes a first stator plate 302 embodied as a circular plate, where a center of the first stator plate 302 is aligned with the center longitudinal axis "L" of the first leg 106. The first stator plate 302 is held in position at the center of the base 208 with aid of four stator arms 304 (individually referred to as "arm 304") spaced radially equidistant from an adjacent arm 304. Further, each arm 304 extends in a plane of the first stator plate 302 between a periphery of the first stator plate 302 and an inner surface 306 of the base 208. Although four arms 104 are shown in FIG. 3, the stator plate may have three, five, six, or more arms, as needed. For example, a larger base may require a larger amount of arms to provide structural support for a correspondingly heavier piston.

According to an aspect of the present disclosure, the inner surface 306 of the base 208 defines four grooves 308 (individually referred to as 'groove 308') spaced radially equidistant from an adjacent groove 308 and extending parallel to the height of the base 208. As depicted in FIG. 2B, the grooves 308 are defined for a predetermined length at the inner surface 306 of the base 208. Further, an end of each arm 304 is configured to engage with one groove 308. Length of each arm 304 may be predetermined and equalized to position the first stator plate 302 at the center of the base 208 such that a central axis (not shown) of the first stator plate 302 is coaxial with the central longitudinal axis "L" of the first leg 106. Such an arrangement allows the first stator plate 302 to move for a distance equal to a length of the grooves 308, in a direction along the central longitudinal axis "L" of the first leg 106.

Referring back to FIG. 2B, an inner surface of the first piston 222 defines four grooves 310 (individually referred to as 'groove 310', two of which are shown as a part of cross-sectional view) spaced radially equidistant from an adjacent groove 310 and extending parallel to the height $H_2$ of the first piston 222. Each groove 310 extends to a predetermined length of the inner surface of the first piston 222. Further, a second stator plate 312 is connected to the first piston 222 through four arms 314 spaced radially equidistant from an adjacent arm 314. An end of each arm 314 of the second stator plate 312 is configured to engage with one groove 310 of the first piston 222, thereby allowing movement of the second stator plate 312 along the central longitudinal axis "L" of the first leg 106.

Furthermore, an inner surface of the second piston 232 defines four grooves 316 (individually referred to as "groove 316", two of which are shown as a part of cross-sectional view) spaced radially equidistant from an adjacent groove 316 and extending parallel to the height $H_3$ of the second piston 232. Each groove 316 extends to a predetermined length of the inner surface of the second piston 232. Further, a third stator plate 318 is connected to the second piston 232 through four arms 320 spaced radially equidistant from an adjacent arm 320. An end of each arm 320 of the third stator plate 318 is configured to engage with one groove 316 of the second piston 232, thereby allowing movement of the third stator plate 318 along the central longitudinal axis "L" of the first leg 106.

The first stator plate 302 defines one or more holes 322 configured to receive fasteners for mounting the first stepper motor 258. Similarly, each of the second stator plate 312 and the third stator plate 318 defines one or more holes (not shown) configured to receive fasteners for mounting the second stepper motor 260 and the third stepper motor 262, respectively.

Figure 4B:
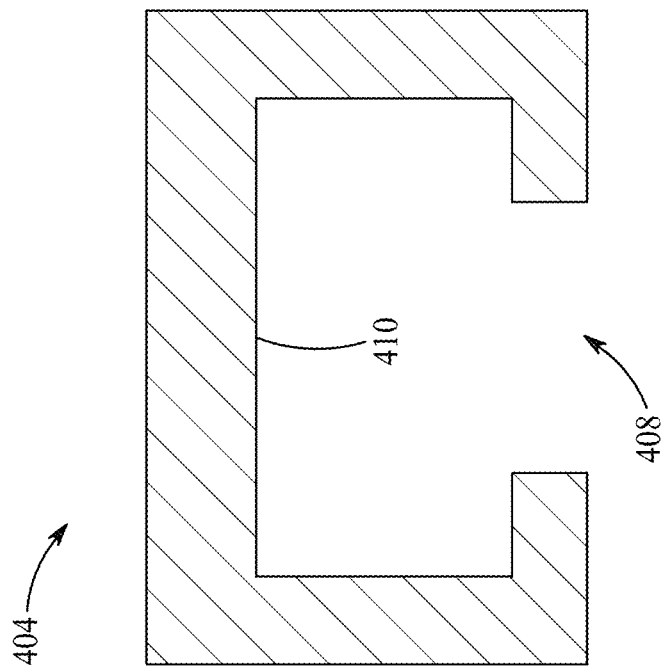
FIG. 4B is a configuration of a track defined in the base of the adjustable support, according to exemplary aspects of the present disclosure.
Figure 4A:
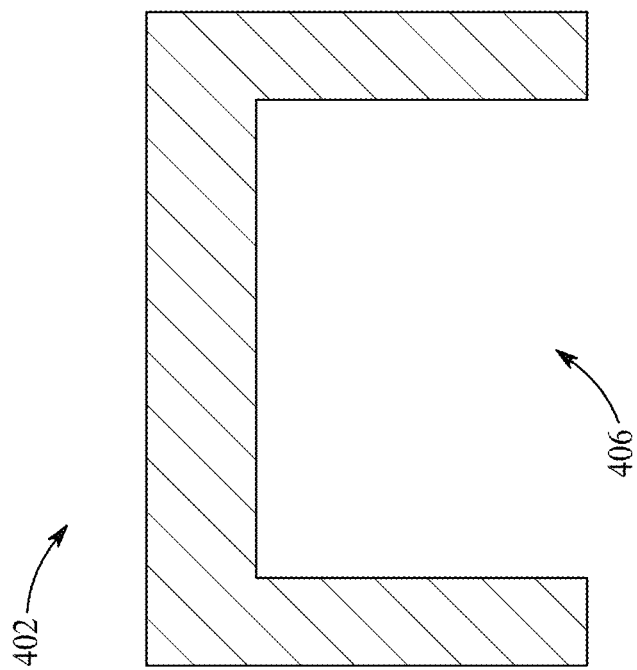
FIG. 4A is a configuration of a groove defined in the base of the adjustable support, according to exemplary aspects of the present disclosure.

The number of stages illustrated and described herein should not be construed as limiting. Based on a height to which the panel 104 is required to be raised and a desired orientation to be achieved, the number of stages in the first leg 106 may vary. Additionally, the number of grooves on respective inner surfaces of the base 208, the first piston 222, and the second piston 232, and the number of arms of each stator plate described herein above are exemplary and should not be construed as limiting. Any number of grooves and arms of the stator plate may be implemented based on a desired size and height of each stage. According to an aspect of the present disclosure, each groove on respective inner surfaces of the base 208, the first piston 222, and the second piston 232 may have a first cross-sectional profile 402 shown in FIG. 4A or a second cross-sectional profile 404 shown in FIG. 4B. As seen in FIG. 4A, the first cross-sectional profile 402 is bounded by three sides which defines a first receiving space 406 adapted to receive the ends of the arms of the respective stator plate. Similarly, the second cross-sectional profile 404 (alternatively referred to as "the track" in the present disclosure) includes a second receiving space 408 defined as a partially enclosed space. The track provides a smooth surface, such as the surface 410, for abutment of the end of the respective arm.

Figure 5:
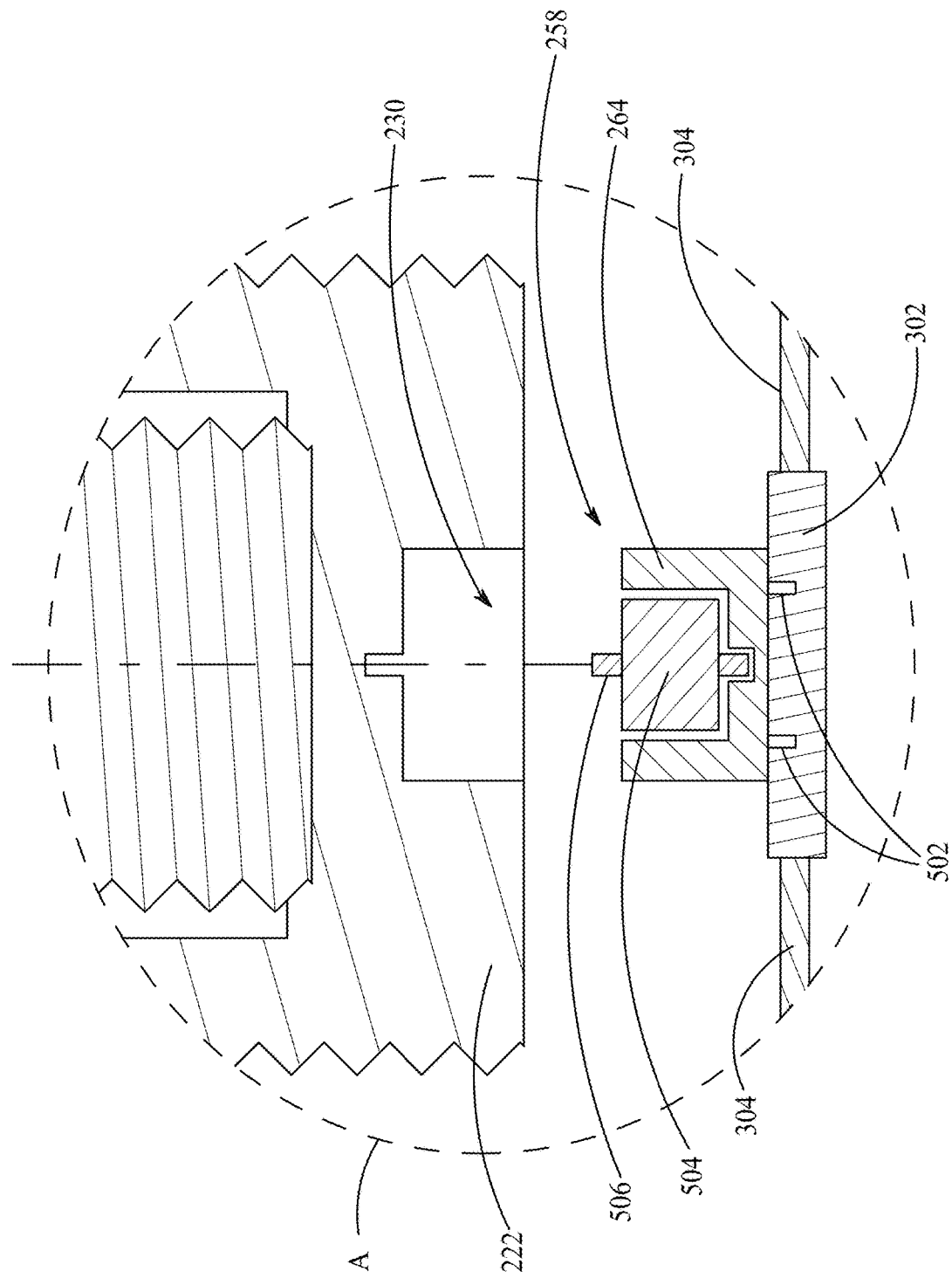
FIG. 5 is an enlarged view of a portion 'A' of the first leg in FIG. 2B, according to exemplary aspects of the present disclosure.

FIG. 5 shows an enlarged view of a portion "A" in FIG. 2B. It should be appreciated that the contents of the portion "A" are not drawn to scale and is merely illustrated for the purpose of describing aspects of the present disclosure. The first stepper motor 258 is connected to the first stator plate 302 via one or more fasteners 502. The first stepper motor 258 includes a first stator 264 operatively connected to a first rotor 504 having a shaft 506. The term "operatively connected" refers to a magnet and a coil arrangement which, when supplied with electric current, results in rotation of the shaft 506 of the first rotor 504. An axis of the shaft 504 is aligned with the central longitudinal axis "L" of the first leg 106. Further, the void space 230 in the first piston 222 is adapted to receive the first stepper motor 258, such that the first stator 264 fits snugly within the void space 230 and the shaft 506 of the first rotor 504 is coupled to the first piston 222.

Similarly, a second stator 266 of the second stepper motor 260 is connected to the second stator plate 312 and operatively connected to a second rotor (not shown), and a third stator 268 of the third stepper motor 262 is connected to the third stator plate 318 and operatively connected to a third rotor (not shown).

Further, the void space 240 in the second piston 232 and the void space 248 in the third piston 242 are adapted to receive the second stator 266 and the third stator 516 respectively, where respective rotor shafts 508, 510 are coupled to the second piston 232 and the third piston 242. In some embodiments, a locking mechanism (not shown) may be provided along a periphery of void space of each piston to secure the respective stepper motor within the void space.

Figure 7:
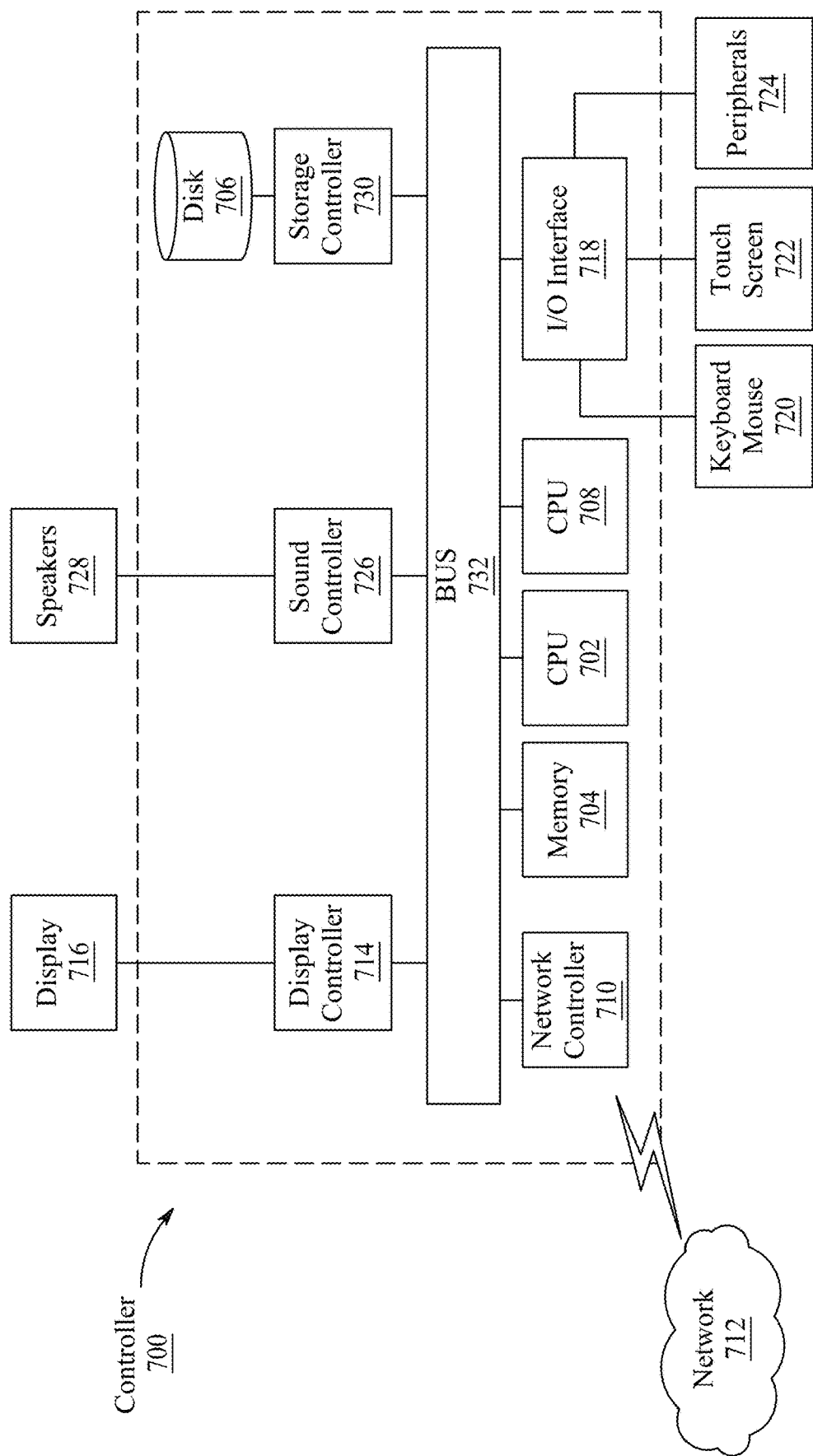
FIG. 7 is an illustration of details of computing hardware used in a controller, according to exemplary aspects of the present disclosure.

During operation, the control module 204 (alternatively referred to as the a computing device 700, see FIG. 7) is configured to provide drive signals to each of the first stepper motor 258, the second stepper motor 260, and the third stepper motor 262 in an order based on the solar tracking. In one embodiment, solar tracking parameters may be stored in a memory 704 (see FIG. 7) of the control module 204. For example, geographical coordinates of the location at which the support 102 is deployed may be stored in the memory 704 and the control module 204 may be configured to obtain data relating to solar tracking, such as sunrise time, sunset time at the location, and trajectory of the sun throughout a given day. In another embodiment, the control module 204 may be configured to receive data relating to the geographical coordinates of the location from a user device (not shown), such as a smart phone. For example, an application in the user device may allow the user device to establish a communication path with the control module 204, where the control module 204 may obtain the data relating to the geographical coordinates of the location and time zone of the location from the user device and store the data in the memory 704. Such a process of configuring the control module 204, based on the location at which the support 102 is deployed, allows the control module 204 to actuate the first leg 106 and the second leg 108 as needed without any further involvement or active monitoring by a user. As such, when the panel assembly 100 is to be transferred from one geographical location to another, the control module 204 may be re-configured to the corresponding geographical locations.

The control module 204 may be configured to provide the drive signal to the first stepper motor 258 based on predefined parameters. In a non-limiting example, the predefined parameters include solar tracking or operator controls. The drive signal may be associated with a supply of electric current. Upon receiving the electric current, the first rotor 504 and the shaft 506 rotates. By virtue of the connection between the first piston 222 and the shaft 506 of the first rotor 504, the first piston 222 is rotated. The shaft 506 of the first rotor 504 may be made of material having a high structural strength to sustain load of the first piston 222 and a power capacity of the first stepper motor 258 be sufficiently high to rotate the first piston 222 against friction between the threads of the outer threaded cylindrical surface 226 of the first piston 222 and threads of the inner threaded cylindrical surface 212 of the base 208. In a non-limiting example, the shaft 506 of the first rotor 504 may be made of hot-rolled steel or carbon fiber reinforced stainless steel.

In addition to the locking mechanism provided along the periphery of the void space 230 in the first piston 222 as described earlier, a suitable material (not shown) having low friction co-efficient may be disposed on the periphery of the void space 230. When the first stepper motor 258 is received within the void space 230 of the first piston 222, such material lies between the periphery of the void space 230 and the first stator 264. Advantageously, presence of such material reduces any friction that may develop between the periphery of the void space 230 and the first stator 264 while the first piston 222 rotates about the central longitudinal axis "L".

Since the first stator 264 is fastened to the first stator plate 302 and the ends of the arms 304 are disposed in the grooves 308 of the base 208, rotation of the first stator 264 is restricted. Based on the threading connection between the first piston 222 and the base 208, the first piston 222 travels in a direction outward with respect to the base 208. The first stator 264 also travels along with the first piston 222 along the central longitudinal axis "L", causing the ends of the arms 304 of the first stator plate 302 to travel along a length of corresponding groove 308 defined in the base 208. However, travel of the ends of the arms 304 are restricted by the predefined length of the grooves 308 defined in the base 208, thereby preventing disengagement of the first piston 222 from the base 208.

In an embodiment, the base 208 may include a sensor (not shown) disposed proximal to the open end of the base 208, where the sensor is configured to sense presence of the arms 304 of the first stator plate 302. The control module 204 may be coupled to the sensor to determine the presence of the arms 304 of the first stator plate 302 proximal to an open end of the base 208. Based on such an arrangement, the control module 204 may be configured to stop supply of electric current to the first stepper motor 258, thereby stopping rotation of the first piston 222 and hence the travel of the first piston 222 in the direction outward with respect to the base 208. With the aid of the threading engagement between the first piston 222 and the base 208, the first piston 222 is retained along the direction of travel of the first piston 222 when the supply of electric current to the first stepper motor 258 is stopped.

Subsequently, the control module 204 may be configured to actuate the second stepper motor 262 followed by actuation of the third stepper motor 262 in a manner similar to that described hereinabove. Additionally, the control module 204 is configured to subsequently or simultaneously actuate the stepper motors of the second leg 108 based on the solar tracking.

Therefore, depending on travel of each stage of the first leg 106 and the second leg 108, tilt angle of the panel 104 may be adjusted based on the solar tracking. By changing polarity of the electric current supplied to the first stepper motor 258, the control module 204 may be configured to retract the first piston 222 into the base 208.

In embodiments where the panel 104 is implemented as a sun shading device, a mirror, or a television mounting plate, the control module 204 may be configured to communicate with a remote control device (not shown), operated by the user, to adjust the travel of each stage of the support 102 based on user input.

According to an aspect of the present disclosure, the end of the arms of each stator plate may be designed to result in minimum friction as the end of the arms travel along the length of corresponding grooves.

Figure 6A:
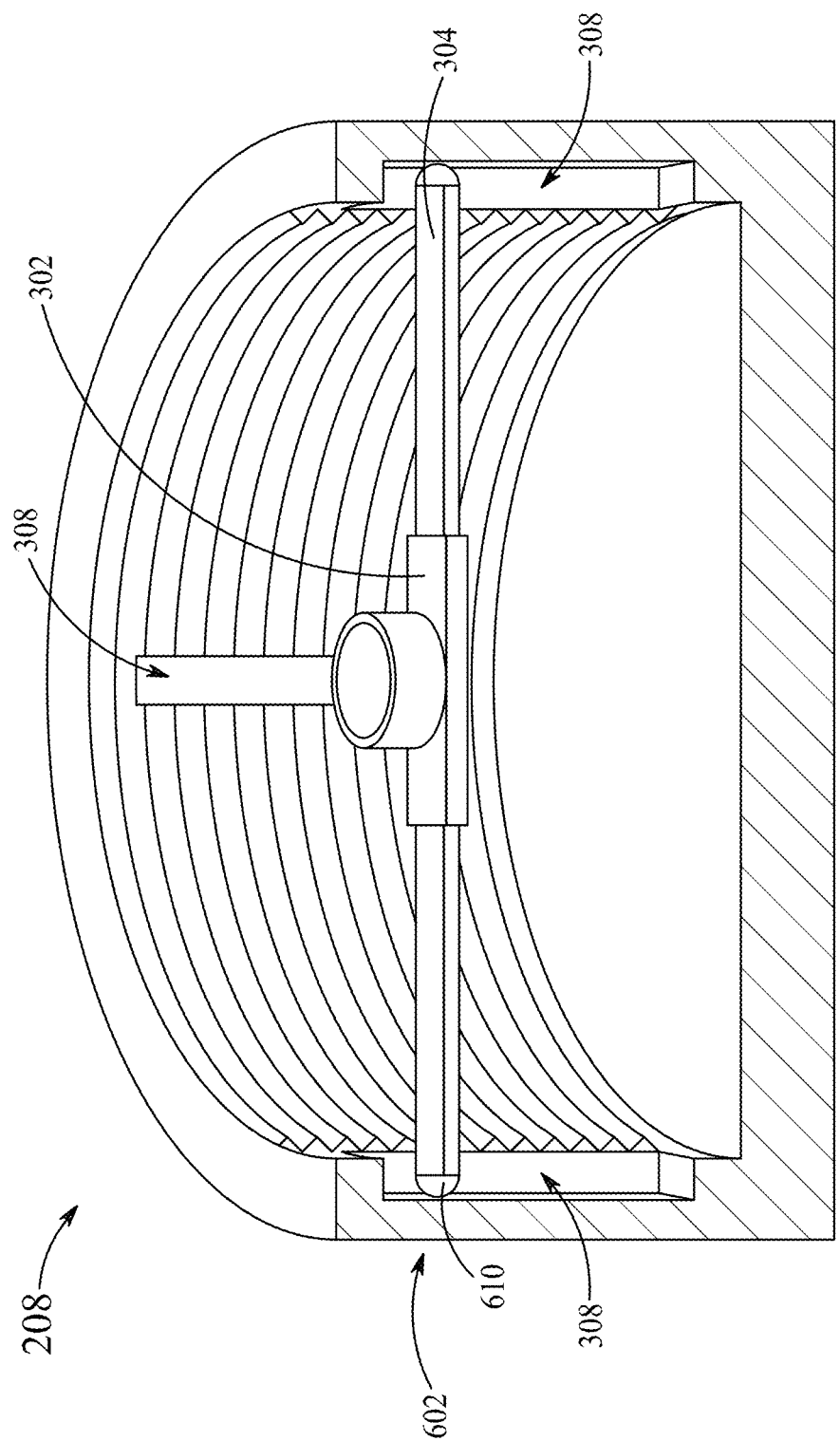
FIG. 6A is a cross-sectional view of the base implementing rounded ends of stator arms, according to exemplary aspects of the present disclosure.

FIG. 6A is a cross-sectional view of the base 208 showing a first configuration 602 of the ends of the arms 304 of the first stator plate 302. As shown in FIG. 6A, the ends of the arms 304 of the first stator plate 302 are rounded (indicated with reference numeral "610") to minimize the friction between the ends of the arms 304 and a surface of the groove 308 of the base 208. In an embodiment, the surface of the groove 308 may be designed to conform with the rounded end 610 of the arms 304.

Figure 6B:
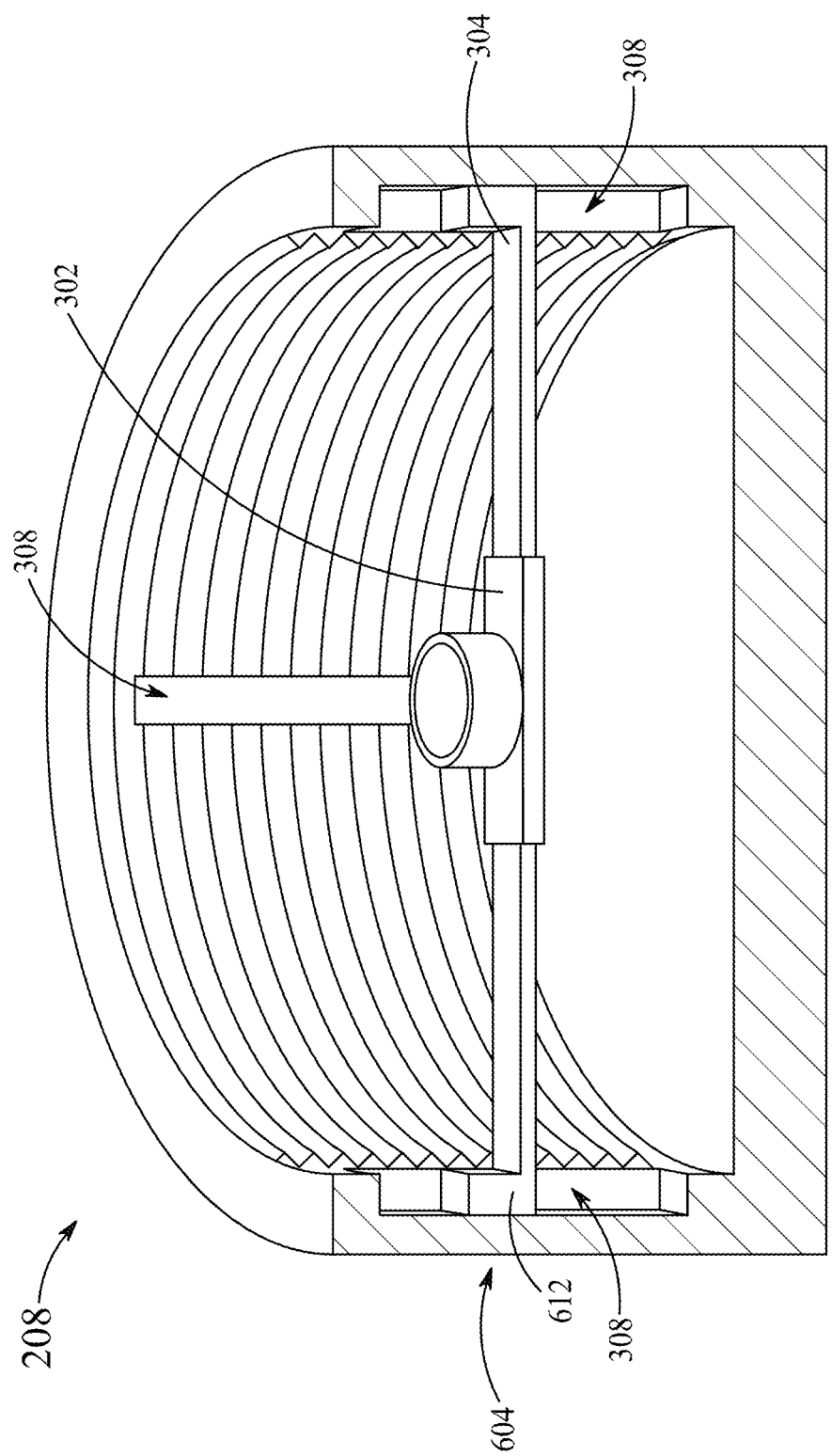
FIG. 6B is a cross-sectional view of the base implementing bent ends of stator arms, according to exemplary aspects of the present disclosure.

FIG. 6B is cross-sectional view of the base 208 showing a second configuration 604 of the ends of the arms 304 of the first stator plate 302. As shown in FIG. 6B, the ends of the arms 304 include a bend 612, such as a 90 degrees bend, to abut the surface of the groove 308. In an embodiment, the surface of the groove 308 may include a lining (not shown) configured to minimize development of the friction between the bent end 612 of the arms 304 and the surface of the groove 308.

Figure 6C:
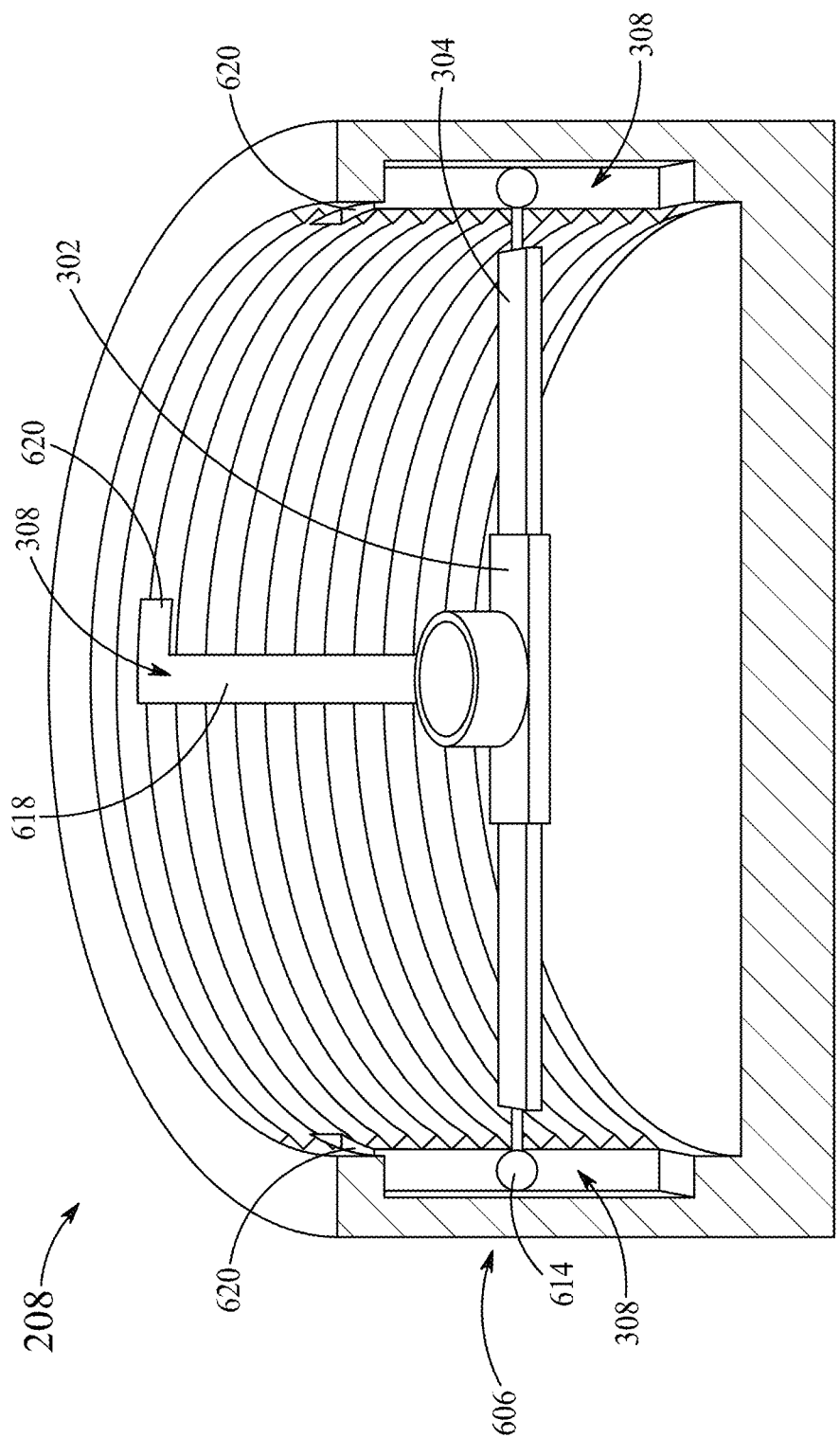
FIG. 6C is a cross-sectional view of the base implementing ball bearing ends of stator arms, according to exemplary aspects of the present disclosure.

FIG. 6C is a cross-sectional view of the base 208 showing a third configuration 606 of the ends of the arms 304 of the first stator plate 302. As shown in FIG. 6C, the ends of the arms 304 include a ball bearing 614. In an embodiment, width of the groove 308 may be designed to conform with diameter of the ball bearing 614. According to an aspect of the present disclosure, a longitudinal path 618 and a lateral path 620 together constitute the groove 308. As described earlier, during the movement of the first piston 222, the first stator plate 302 and the arms 304 extending from the first stator plate 302 move along with the first piston 222. During such movement, the ball bearing 614 moves along the longitudinal path 618 of the groove 308 and restricts rotation of the first stator plate 302. On reaching an end of the longitudinal path 618 of the groove 308, the ball bearing 614 moves into the lateral path 620 of the groove 308 by the virtue of the rotation of the first piston 222. The lateral path 620 of the groove 308 holds the end of the arm 304 securely in place and restricts any further rotational movement and travel of the first piston 222. During retraction of the first piston 222 into the base 208, the ball bearing 614 moves towards the longitudinal path 618 of the groove 308 and subsequently moves along the longitudinal path 618 of the groove 308 to allow retraction of the first piston 222. Similar configuration of the groove 308 is provided in each of the first piston 222 and the second piston 232.

Figure 6D:
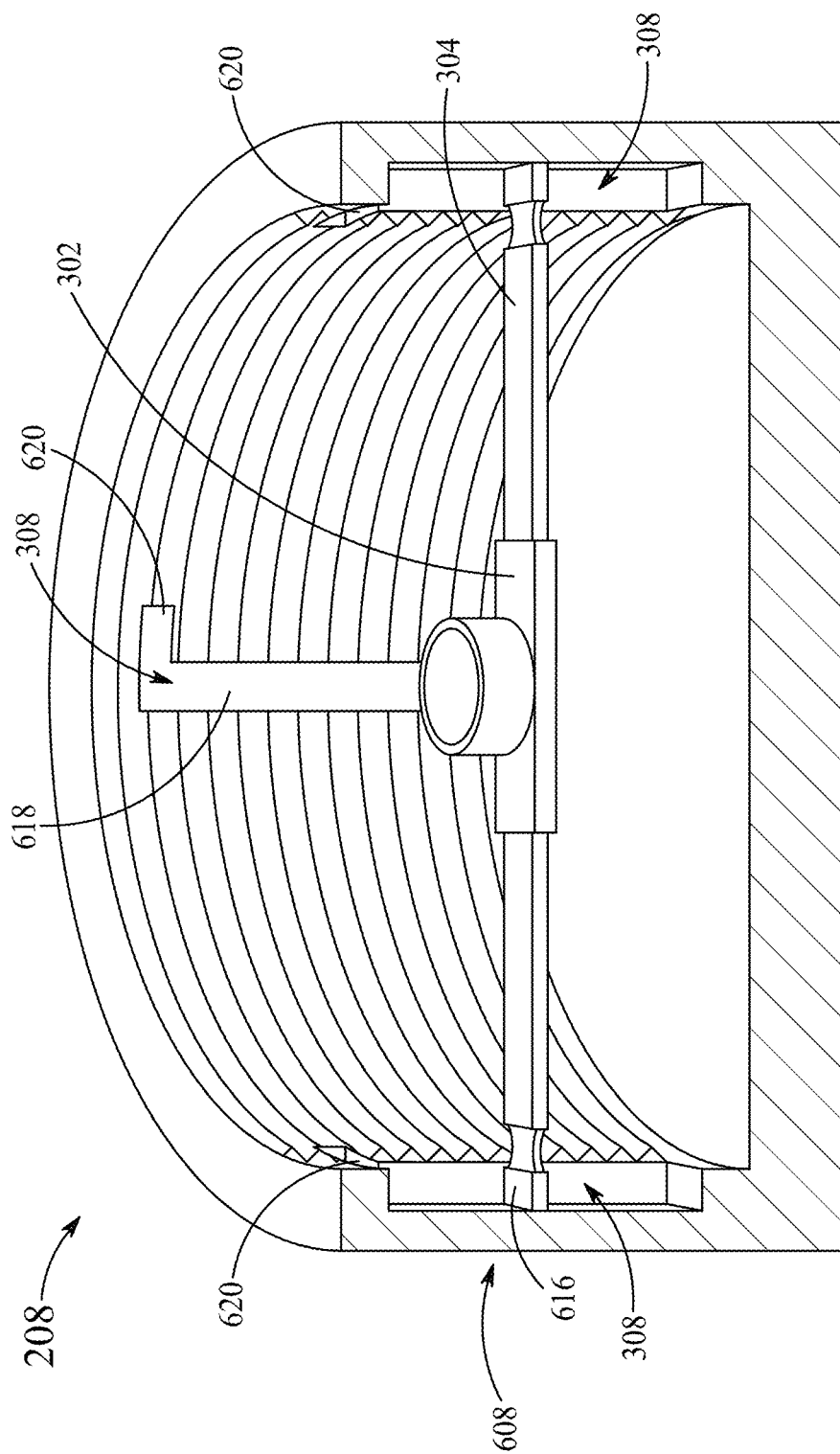
FIG. 6D is a cross-sectional view of the base implementing indented ends of stator arms, according to exemplary aspects of the present disclosure.

FIG. 6D is a cross-sectional view of the base 208 showing a fourth configuration 608 of the ends of the arms 304 of the first stator plate 302. As shown in FIG. 6D, the ends of the arms 304 include an indentation 616. Similar to the movement of the ball bearing 614 described with respect to FIG. 6C, the indentation 616 of the arms 304 occupy the lateral path 620 of the groove 308 when the arms 304 travels towards an end of the groove 304, thereby retaining the end of the arms 304 and retaining the first piston 222 in place as the second piston 232 begins to move outward with respect to the first piston 222.

Further, details of the hardware of the control module 304 are described with reference to FIG. 7. In FIG. 7, a controller 700 is described which is representative of the control module 304 and which includes a CPU 702 which performs the processes described above and below. The process data and instructions may be stored in memory 704. The data and instructions may also be stored on a storage medium disk 706, such as a hard drive (HDD) or a portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 702, 708 and an operating system such as Microsoft Windows 7, Microsoft Windows 10, UNIX, Solaris, LINUX, Apple MAC-OS and other known systems.

The hardware elements, in order to achieve the controller 700, may be realized by various circuitry elements. For example, CPU 702 or CPU 708 may be a Xenon or Core processor from Intel of America or an Opteron processor from AMD of America, or may be other processor types that would be recognized by one of ordinary skill in the art. Alternatively, the CPU 702, 708 may be implemented on an FPGA, ASIC, PLD or using discrete logic circuits, as one of ordinary skill in the art would recognize. Further, CPU 702, 708 may be implemented as multiple processors cooperatively working in parallel to perform the instructions of the inventive processes described above.

The controller 700 in FIG. 7 also includes a network controller 710, such as an Intel Ethernet PRO network interface card from Intel Corporation of America, to interface with network 712. As can be appreciated, the network 712 can be a public network, such as the Internet, or a private network such as an LAN or WAN network, or any combination thereof and can also include PSTN or ISDN sub-networks. The network 712 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The controller 700 further includes a display controller 714, such as a NVIDIA GeForce GTX or Quadro graphics adaptor from NVIDIA Corporation of America for interfacing with display 716, such as a Hewlett Packard HPL2445w LCD monitor. A general purpose I/O interface 718 interfaces with a keyboard and/or mouse 720 as well as a touch screen panel 722 on or separate from display 716. General purpose I/O interface also connects to a variety of peripherals 724 including printers and scanners, such as an OfficeJet or DeskJet from Hewlett Packard.

A sound controller 726 is also provided in the computing device such as Sound Blaster X-Fi Titanium from Creative, to interface with speakers/microphone 728 thereby providing sounds and/or music.

The general-purpose storage controller 730 connects the storage medium disk 706 with communication bus 732, which may be an ISA, EISA, VESA, PCI, or similar, for interconnecting all the components of the computing device. A description of the general features and functionality of the display 716, keyboard and/or mouse 720, as well as the display controller 714, storage controller 726, network controller 710, sound controller 726, and general purpose I/O interface 718 is omitted herein for brevity as these features are known.

Figure 8:
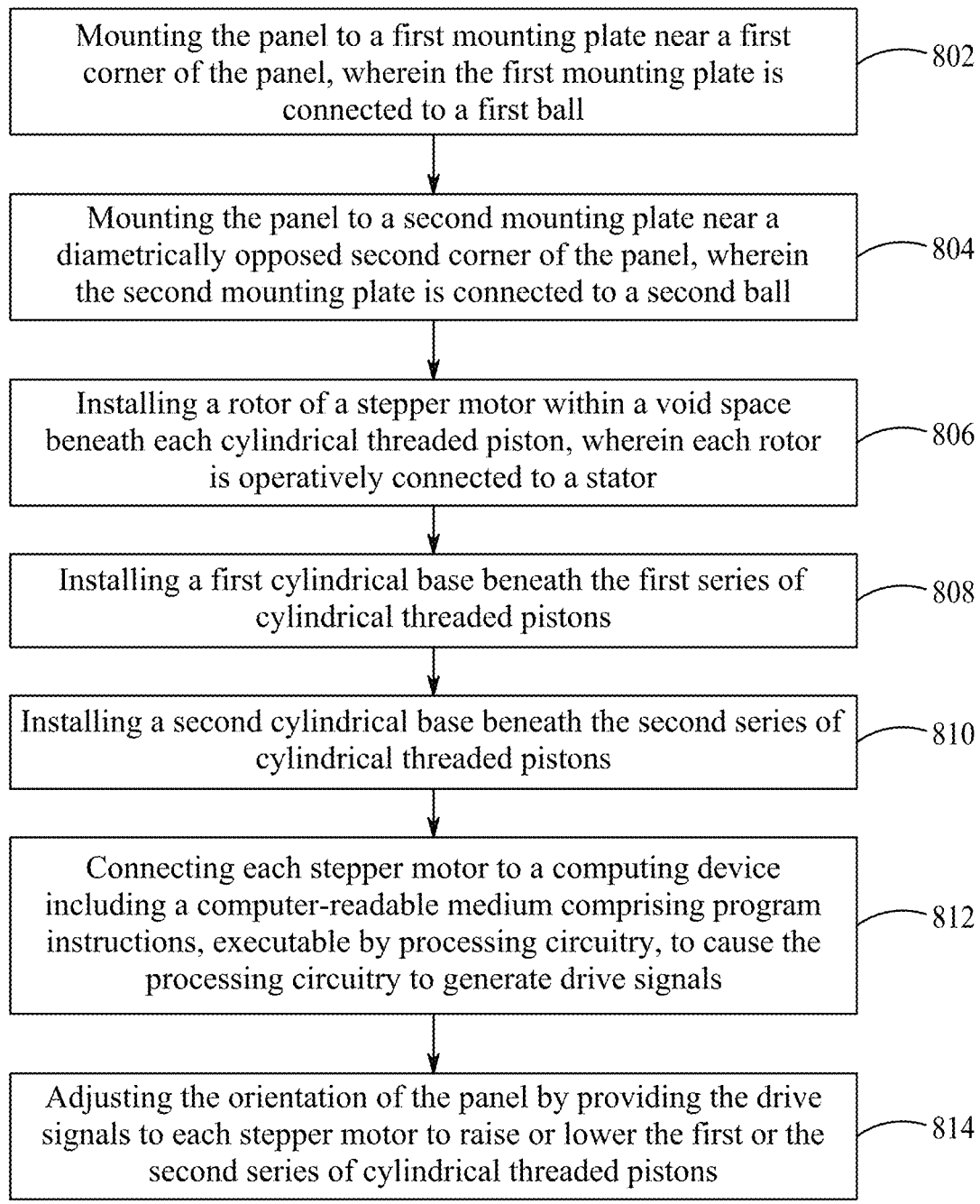
FIG. 8 is a flowchart of a method for adjustably supporting the panel, according to exemplary aspects of the present disclosure.

FIG. 8 is a flowchart of a method 800 for adjustably supporting the panel 104.

At step 802, the method 800 includes mounting the panel 104 to the first mounting plate 110 near a first corner of the panel 104, wherein the first mounting plate 110 is connected to a first ball 256. Although not specifically illustrated in FIG. 8, the method 800 further includes connecting the first ball 256 to a first ball pod socket 220, connecting the second ball to a second ball pod socket, connecting the first ball pod socket 220 to a first piston 242 of a first series of cylindrical threaded pistons, and connecting the second ball pod socket to a first piston of a second series of cylindrical threaded pistons.

At step 804, the method 800 includes mounting the panel 104 to the second mounting plate 112 near a second corner of the panel 104 that is diametrically opposite to the first corner thereof, wherein the second mounting plate 112 is connected to a second ball.

At step 806, the method 800 includes installing a rotor, such as the rotor 506, of a stepper motor, such as the first stepper motor 258, within a void space, such as the void space 230, beneath each cylindrical threaded piston, wherein each rotor is operatively connected to a stator.

At step 808, the method 800 includes installing a first cylindrical base 208 beneath the first series of cylindrical threaded pistons.

At step 810, the method 800 includes installing a second cylindrical base beneath the second series of cylindrical threaded pistons.

At step 812, the method 800 includes connecting each stepper motor to a computing device 204 including a computer-readable medium comprising program instructions, executable by processing circuitry, to cause the processing circuitry to generate drive signals.

At step 814, the method 800 includes adjusting the orientation of the panel 104 by providing the drive signals to each stepper motor to raise or lower the first or the second series of cylindrical threaded pistons.

According to an aspect of the present disclosure, the method 800 includes connecting the first ball pod socket 220 to a top of the first piston of the first series at a non-threaded outer surface, providing the first piston with threads on its outer surface, and drilling a first void space in a base of the first piston, wherein the first void space has dimensions configured to secure a first stepper motor and first shaft within the first void space.

According to an aspect of the present disclosure, the method 800 further includes forming each of a second and third pistons of the first series to have a threaded outer surface, a partially hollow cylindrical threaded interior and a solid base, drilling a second and a third void space within the solid base of the second and third pistons respectively, and forming the first cylindrical base to have a partially hollow cylindrical threaded interior and a solid base.

According to an aspect of the present disclosure, the method 800 further includes forming four equally spaced grooves within an interior surface of each of the hollow cylindrical base and each hollow cylindrical piston, wherein each groove is parallel to a height of each hollow cylinder, installing on each stator a stator plate having four equally spaced arms extending in the plane of the stator plate, wherein an end of each arm of the each stator plate is configured to engage within a respective groove of a hollow cylinder beneath the rotor, and rotating each rotor to raise or lower its respective hollow cylinder and stator by engaging with the threads of the hollow cylinder, where the arms of the stator plate engaged within the grooves keep the stator from rotating.

According to an aspect of the present disclosure, the method 800 further includes actuating the stepper motors by the drive signals to rotate the first piston to engage the outer threads of the first piston with the inner threads of the second piston and lower or raise the first piston within the second piston, rotate the second piston to engage the outer threads of the second piston with the inner threads of the third piston to lower or raise the second piston within the third piston, and rotate the third piston to engage the outer threads of the second piston with the inner threads of the first cylindrical base to lower or raise the second piston within the first cylindrical base. The method 800 also includes lowering the first, second and third piston so that a top of each piston is flush with a top of the first cylindrical base.

According to an aspect of the present disclosure, the method 800 further includes connecting the second ball pod socket to a top of the first piston of the second series at a non-threaded outer surface, providing the first piston with threads on its outer surface, drilling a first void space in a base of the first piston, wherein the first void space has dimensions configured to secure a first stepper motor and first shaft within the first void space.

The method 800 further includes forming each of a second and third piston of the second series to have a threaded outer surface, a partially hollow cylindrical threaded interior and a solid base, forming a second and a third void space within the solid base of the second and third pistons respectively, forming the second cylindrical base to have a partially hollow cylindrical threaded interior and a solid base.

The method 800 further includes rotating the first piston to engage the outer threads of the first piston with the inner threads of the second piston and lower or raise the first piston within the second piston, rotating the second piston to engage the outer threads of the second piston with the inner threads of the third piston to lower or raise the second piston within the third piston, rotating the third piston to engage the outer threads of the second piston with the inner threads of the second cylindrical base to lower or raise the second piston within the second cylindrical base, and raising the first, second and third piston so that each piston is fully extended.

Obviously, numerous modifications and variations of the present disclosure are possible in light of the above teachings. It is therefore to be understood that within the scope of the appended claims, the invention may be practiced otherwise than as specifically described herein.

The invention claimed is:
1. A solar module with tilt freedom, comprising:
an adjustable support;
a solar panel; and
a control unit;
wherein the adjustable support comprises:
  a first and a second leg, each leg including:
    a hollow cylindrical base having an outer diameter $D_1$, an inner diameter $D_2$ and a first closed end;
    a first stage including a first hollow cylindrical piston of outer diameter $D_2$, inner diameter $D_3$ and a second closed end;
    a first rotor of a first stepper motor located within a void space of the second closed end;
    a second stage including a second hollow cylindrical piston of outer diameter $D_3$, inner diameter $D_4$ and a third closed end;
    a second rotor of a second stepper motor located within a void space of the third closed end;
    a third stage including a third cylindrical piston of outer diameter $D_4$ and a fourth closed end;
    a third rotor of a third stepper motor located within a void space of the fourth closed end;
    a ball pod socket connected to an open end of the third cylindrical piston;
    a ball connected to a mounting plate, wherein the ball is configured to be rotatably supported within the pod socket; and
    wherein $D_1 > D_2 > D_3 > D_4$, wherein the solar panel is attached to the mounting plate of the first leg at a first location and to the mounting plate of the second leg at a second location;
wherein the stepper motors are configured to raise or lower each stage of the first leg and the second leg to adjust a tilt of the panel;
wherein the control unit includes program instructions, executable by processing circuitry, to cause the processing circuitry to provide drive signals to each stepper motor to adjust the tilt of the panel; and
wherein the program instructions further cause the processing circuitry to perform solar tracking and provide drive signals to each stepper motor to adjust the tilt of the solar panel based on the solar tracking.

2. The solar module of claim 1, wherein:
each of the first, second and third hollow cylindrical pistons includes an outer threaded cylindrical surface;
each of the hollow cylindrical base, the first cylindrical piston and second cylindrical pistons include an inner threaded cylindrical surface;
each of the second stage, third stage and fourth stage have a threaded outer cylindrical surface;
threads of the inner cylindrical surface of the base stage are configured to intermesh with threads of the outer cylindrical surface of the second stage;
threads of the inner cylindrical surface of the second stage are configured to intermesh with threads of the outer cylindrical surface of the third stage; and
threads of the inner cylindrical surface of the third stage are configured to intermesh with threads of the outer cylindrical surface of the fourth stage.

3. The solar module of claim 2, wherein:
each stepper motor includes a shaft;
each stepper motor has a circumference and a depth, and the void space of each of the first, second and third pistons has dimensions configured to secure its respective rotor and shaft within the void space.

4. The solar module of claim 3, wherein:
the first stepper motor is configured to rotate the first hollow cylindrical piston within the hollow cylindrical base to raise or lower the second stage;
the second stepper motor is configured to rotate the second hollow cylindrical piston within the first stage to raise or lower the third stage; and
the third stepper motor is configured to rotate the third cylindrical piston within the second stage to raise or lower the fourth stage.

5. The solar module of claim 4, further comprising:
a first stator operatively connected to the first rotor;
a first stator plate connected to the first stator;
a second stator operatively connected to the second rotor;
a second stator plate connected to the second stator;
a third stator operatively connected to the third rotor;
a third stator plate connected to the third stator;
wherein each stator plate has four equally spaced arms extending in the plane of the stator plate;
wherein each of the hollow cylindrical base and each hollow cylindrical piston has four equally spaced grooves in its inner surface, wherein each groove is parallel to the height of each stage;
wherein an end of each arm of the first stator plate is configured to engage within a respective groove of the hollow cylindrical base;
wherein each end of each arm of the second stator plate is configured to engage within a respective groove of the first hollow cylindrical piston; and
wherein each end of each arm of the third stator plate is configured to engage within a respective groove of the second hollow cylindrical piston.

6. The solar module of claim 1, wherein:
the base stage has a height $H_1$;
the second stage has a height $H_2$;
the third stage has a height $H_3$;
the fourth stage has a height $H_4$;
the ball pod plus ball has a height $H_5$;
$H_1 > H_2 > H_3 > H_4$; and
$H_4 = H_5$.

7. The solar module of claim 1, wherein:
the solar panel is a mirror attached to the mounting plate of the first leg at a first location and to the mounting plate of the second leg at a second location; and
the stepper motors are configured to raise or lower each stage of the first leg and the second leg to adjust the tilt of the mirror.

8. The solar module of claim 6, wherein:
$D_2 = 0.75 D_1$;
$D_3 = 0.5 D_1$;
$D_4 = 0.25 D_1$;
$H_2 = 5/6\ H_1$;
$H_3 = 2/3\ H_1$; and
$H_4 = H_5 = 0.5\ H_1$.

* * * * *